(12) United States Patent
Schneider et al.

(10) Patent No.: US 6,701,380 B2
(45) Date of Patent: Mar. 2, 2004

(54) METHOD AND SYSTEM FOR INTELLIGENTLY CONTROLLING A REMOTELY LOCATED COMPUTER

(75) Inventors: Walter J. Schneider, Brier, WA (US); Warren C. Jones, Renton, WA (US); Mark D. Sasten, Duvall, WA (US)

(73) Assignee: Avocent Redmond Corp., Redmond, WA (US)

( * ) Notice: Subject to any disclaimer, the term of this patent is extended or adjusted under 35 U.S.C. 154(b) by 0 days.

(21) Appl. No.: 10/365,441

(22) Filed: Feb. 13, 2003

(65) Prior Publication Data

US 2003/0135656 A1 Jul. 17, 2003

Related U.S. Application Data

(63) Continuation of application No. 09/682,761, filed on Oct. 15, 2001, now Pat. No. 6,539,418, which is a continuation of application No. 09/359,376, filed on Jul. 23, 1999, now Pat. No. 6,304,895, which is a continuation-in-part of application No. 08/916,685, filed on Aug. 22, 1997, now abandoned.

(51) Int. Cl.[7] .............................................. G06F 13/00
(52) U.S. Cl. ....................................... 709/250; 709/247
(58) Field of Search ................................. 709/200, 201, 709/203, 217, 218, 219, 247, 250

(56) References Cited

U.S. PATENT DOCUMENTS

| 5,008,747 | A | | 4/1991 | Carr et al. ................... 358/136 |
|---|---|---|---|---|
| 5,483,634 | A | * | 1/1996 | Hasegawa .................... 395/162 |
| 5,552,832 | A | | 9/1996 | Astle ........................... 348/420 |
| 5,576,845 | A | * | 11/1996 | Komatsu ..................... 358/433 |
| 5,757,424 | A | | 5/1998 | Frederick .................... 348/218 |
| 5,802,213 | A | * | 9/1998 | Gardos ........................ 382/239 |
| 6,016,166 | A | | 1/2000 | Huang et al. ................ 348/515 |
| 6,091,857 | A | * | 7/2000 | Shaw et al. .................. 382/251 |
| 6,173,082 | B1 | * | 1/2001 | Ishida et al. ................. 382/254 |
| 6,304,895 | B1 | | 10/2001 | Schneider et al. .......... 709/203 |
| 6,571,016 | B1 | * | 5/2003 | Mehrotra et al. ........... 382/236 |

* cited by examiner

Primary Examiner—Moustafa M. Meky
(74) Attorney, Agent, or Firm—Oblon, Spivak, McClelland, Maier & Neustadt, P.C.

(57) ABSTRACT

A method and system for remotely accessing and controlling at least one of a target switch and a target computer using a target controller. The video information captured by the target controller is analyzed and compressed in order to reduce network traffic between the target controller and a controlling computer.

9 Claims, 13 Drawing Sheets

METHOD AND SYSTEM FOR INTELLIGENTLY CONTROLLING A REMOTELY LOCATED COMPUTER

CROSS REFERENCE TO RELATED APPLICATIONS

The present application is related to and claims priority to application Ser. No. 09/682,761, filed Oct. 15, 2001, now U.S. Pat. No. 6,539,418 which is a continuation of application Ser. No. 09/359,376, filed Jul. 23, 1999, now U.S. Pat. No. 6,304,895, which is a continuation-in-part of application Ser. No. 08/916,685, filed Aug. 22, 1997, now abandoned. The contents of those applications are incorporated herein by reference in their entirety.

BACKGROUND OF INVENTION

1. Field of the Invention

The present invention is directed to a method and system for intelligently controlling a remotely located computer. More specifically, the present invention is directed to a control system connected to a video output port and at least one data input port of a computer located in a first location. A user located in a second location, remote from the first location, controls the computer in the first location through the control system as if the user were directly connected to computer at the first location.

2. Discussion of the Background

Modern computing has migrated away from the use of centralized mainframes to the use of individual (or personal) computers. With that migration has come a decentralization of many of the resources that were centralized in a mainframe environment (e.g., peripheral devices including magnetic or optical disks and their associated files). That decentralization has not been accompanied by an equivalent increase in peer-to-peer networking capabilities such that those decentralized resources are available to a user as the user moves. Moreover, system administration of multiple physically remote systems increases maintenance concerns.

As a result of the lack of peer-to-peer access, a number of systems have been developed to provide control of remote computers. Unfortunately, many of those solutions have provided very limited control of the remote computer. The most rudimentary type of control is a text-based dialup connection. Control of the remote system is then performed through terminal emulation. Control using terminal emulation is also possible through network connections as opposed to dialup connections. Using (1) a telnet server (or daemon) on the remote computer and (2) a telnet client on the local computer, a user can connect to a remote computer—even across a wide area network (e.g., the Internet). However, telnet access also is limited by the fact that such control requires additional software (i.e., the server) to be running on the remote computer. Such server software may "crash" due to the errant operation of the computer. As a result, access to and control of the remote computer is lost after a crash or after a system "hang." In addition, such server software does not begin running on the remote computer until after the boot-up sequence. Thus, it is not possible to watch or alter the boot-up process using a telnet server.

More sophisticated remote control systems include the capability for graphics. Carbon Copy 32 from Compaq and LapLink from Traveling Software allow for remote access of computers while enabling a graphical user interface of the remote computer to be displayed at a user's local computer. Carbon Copy and LapLink on Windows 95, 98, NT and 2000 utilize "hooks" in the display subsystem of the remote computer to capture drawing requests (in the form of GDI calls). Those drawing requests are sent via a communications adapter to a Carbon Copy or LapLink client program running on the local computer. Once the drawing requests are received locally, the Carbon Copy or LapLink client program "re-executes" the requests so that the drawing operation is performed locally. Accordingly, the local computer displays both the local and remote images.

In addition, when using Carbon Copy or LapLink in a low to medium bandwidth connection (e.g., a 28.8 K or 56 K modem connection over a telephone line), the amount of data to be transferred becomes an important issue. In such a connection, there is insufficient bandwidth to send a complete copy of the screen frequently. PCAnywhere produced by Symantec of Cupertino, Calif. is an additional remote control program requiring server software on the remote computer in order to transfer graphics between computers.

An alternate graphical control system is the X Windows system, often run on UNIX workstations. Using X Windows, a server program running on a local computer receives drawing requests from an application running on (i.e., using the CPU and memory resources of) a remote computer. Although it is possible to utilize the X Windows graphical user interface over a wide area network, the X Windows system, like the terminal emulator and Carbon Copy systems, requires that application software be running on the remote computer in order to control the remote computer. That requirement prevents an X Windows-based system from being able to analyze or modify the boot process of the computers that it controls.

U.S. Pat. No. 5,732,212, to Perholtz et al., entitled "SYSTEM AND METHOD FOR REMOTE MONITORING AND OPERATION OF PERSONAL COMPUTERS," discloses a system in which the video, keyboard and mouse ports of a remote computer are connected to a host unit. The host unit may communicate with a local computer via a modem connection over phone lines. As described in the abstract of that patent, the video raster signal is converted to digital form.

SUMMARY OF INVENTION

It is an object of the present invention to provide control of a remote computer independent of the operating system of the remote computer.

It is a further object of the present invention to provide a method and system for analyzing the screen information transmitted between the remote control system and the local computer in order to reduce the required bandwidth.

These and other objects of the present invention are provided by a remote control system that connects to a remotely located computer via a video port and one or more data input/output ports (e.g., keyboard, mouse, touch The system does not utilize resources of the remotely controlled computer, thus, the present invention operates independently of the operating system (and BIOS) of the remotely controlled computer.

BRIEF DESCRIPTION OF DRAWINGS

A more complete appreciation of the invention and many of the attendant advantages thereof will become readily apparent with reference to the following detailed description, particularly when considered in conjunction with the accompanying drawings, in which:

FIGS. 9a and 9b are block diagrams showing compression headers and data for sending incremental changes.

DETAILED DESCRIPTION

Figure 1A:
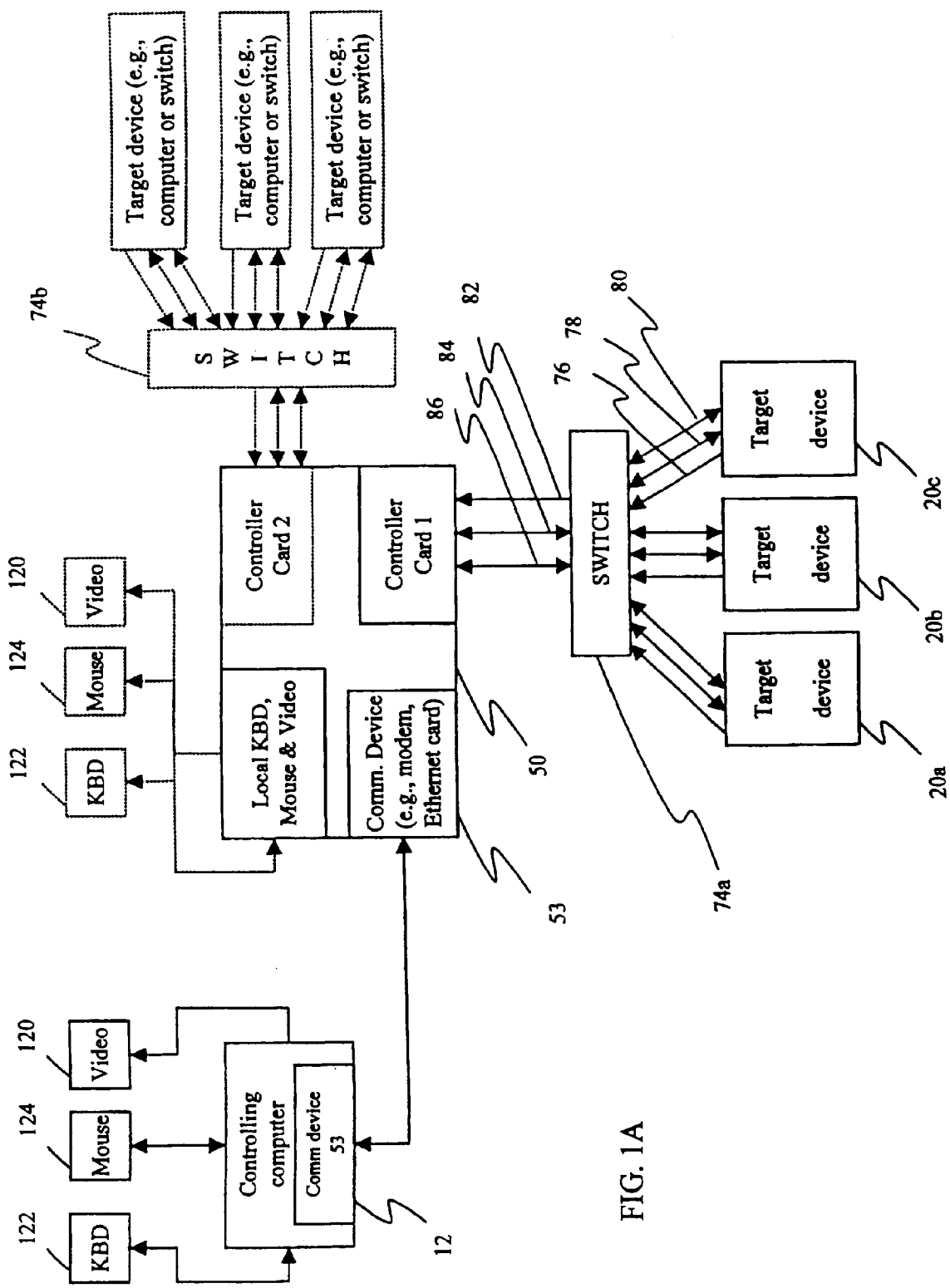
FIGS. 1A–1C are block diagrams of a system for accessing and controlling a remotely located target computer system according to the present invention.

Referring now to the drawings, in which like reference numerals designate identical or corresponding parts throughout the several views, FIG. 1A is a block diagram of a system for accessing and controlling a remotely located computer system according to the present invention. In general, the system of the present invention transmits a GDI representation of digitized video signals as well as mouse and keyboard signals over a communications link. Since "local" versus "remote" is a matter of perspective, a set of consistent terminology is used throughout this application which ignores relative perspective. Herein, the phrase "target device" refers to a computer or switch that has its video output connected to the digitizer of the present invention. For example, in FIG. 1A, the computers 20a through 20c are connected through switch 74a. Thus, any of those computers 20, as well as the switch 74a, may be referred to herein as a target device. When referring to a target device that is a computer, that computer herein is referred to as a target computer. Similarly, when referring to a target device that is a switch, that switch is referred to herein as a target switch. Typically, the target computers are server computers that are connected to a computer network and operate to perform such tasks as controlling the operation of the network, storing commonly used programs or data, or connecting a local area network (LAN) to a wide area network (WAN) (e.g., the Internet). Those computers may be either computers in separate housings or part of a rack-mounted system. In an alternate embodiment, a target computer is a computer that controls any external hardware or equipment (including storage area network, factory equipment or consumer electronics/appliances).

Figure 2:
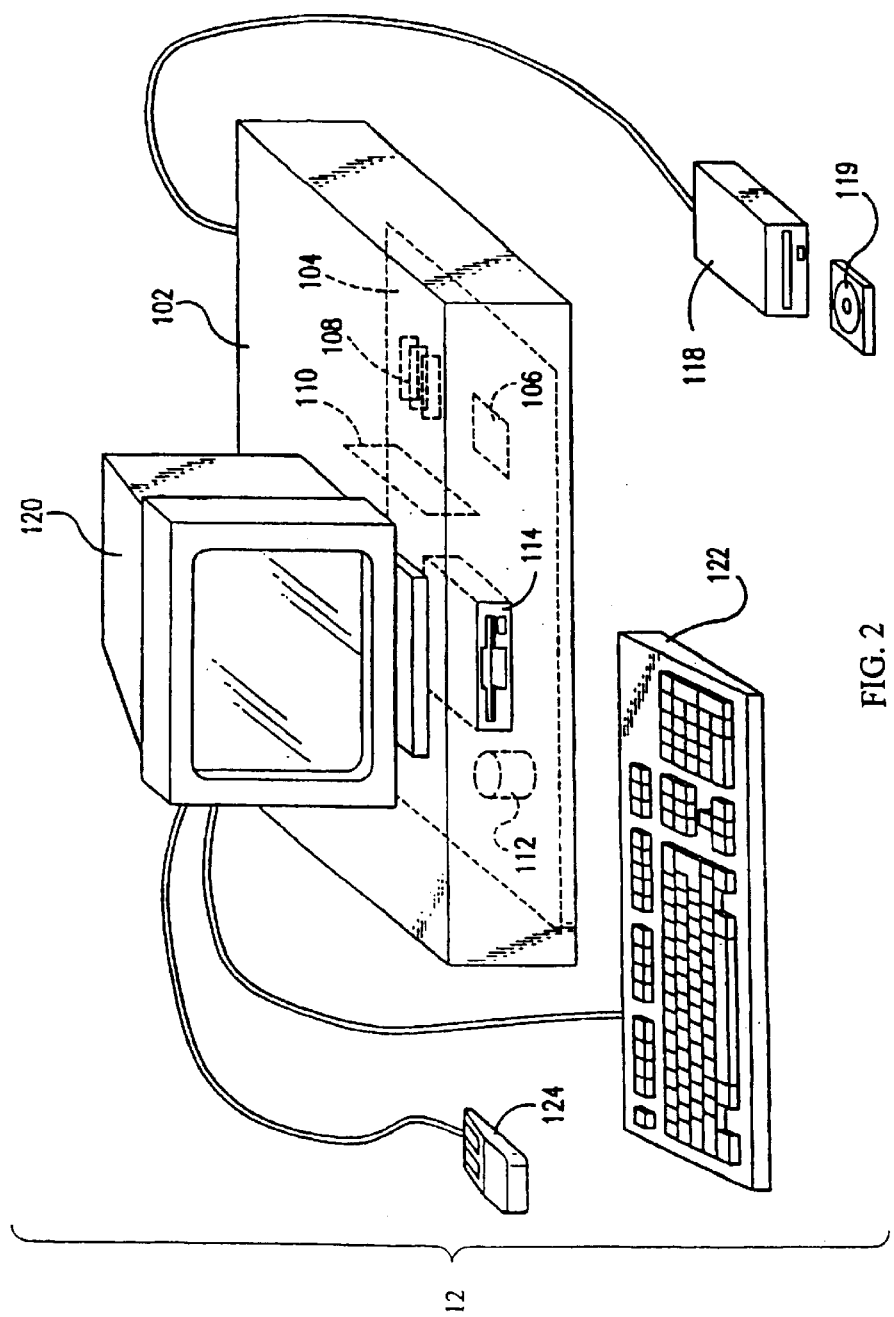
FIG. 2 is a schematic illustration of the controlling computer of FIG. 1A.

By contrast, the computer that indirectly controls the target device(s) is referred to herein as "the controlling computer." The computer 12 in FIG. 1A is the controlling computer and is shown in greater detail in FIG. 2. Specifically, the computer 12 includes a computer housing 102 that houses a motherboard 104. The motherboard 104 includes a CPU 106 (e.g., Intel 80x86, Motorola 680x0, or PowerPC), memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The controlling computer 12 also includes plural input devices, (e.g., a keyboard 122 and mouse 124), and a display card 110 for controlling monitor 120. In addition, the computer system 12 further includes magnetic or optical storage devices. Such storage devices include, but are not limited to, a floppy disk drive 114; compact disc reader 118, tape; and a hard disk 112, any of which are connected using an appropriate device bus (e.g., a SCSI bus, an Enhanced IDE bus, or an Ultra DMA bus). Also connected to the same device bus or another device bus, the computer 12 may additionally include a compact disc reader/writer unit (not shown) or a compact disc jukebox (not shown). Although a compact disc 119 is shown in a CD caddy, the compact disc 119 can be inserted directly into CD-ROM drives that do not require caddies. In addition, a printer (not shown) also provides printed listings of operations of the present invention.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 12 and for enabling the computer 12 to interact with a human user. Such software may include, but is not limited to, device drivers, operating systems and user applications, such as development tools. Such computer readable media further includes the computer program product of the present invention for remotely accessing and controlling a target computer (or switch). The phrase "computer code devices" as used herein can be either interpreted or executable code mechanisms, including but not limited to scripts, interpreters, dynamic link libraries, subroutines, Java methods and/or classes, and partial or complete executable programs. Moreover, although portions of the specification describe the operation of portions of the present invention in terms of a microprocessor and a specially programmed memory, one of ordinary skill in the art will appreciate that a portion of or all of those described functions may be implemented in a configurable logic device. Such a logic device may be either a one-time programmable (OTP) logic device or a field programmable gate array (FGPA). It will also be appreciated by one of ordinary skill in the art that a single computer code device and/or logic device may implement more than one of the described functions without departing from the spirit of the present invention.

In addition, in a first embodiment using a "system on a chip," the present invention is implemented as (1) a digital system that includes an integrated microprocessor, memory and specialized logic on a single- or multi-chip module and (2) analog-to-digital and digital-to analog converters. In a second embodiment using a "system on a chip," the present invention is implemented as a mixed-signal system that includes an integrated microprocessor, memory, specialized logic, and analog-to-digital and digital-to analog converters on a single- or multi-chip module. As used herein, "means" will be understood to include any one of the computer code devices, logic devices, and/or systems on a chip, in any combination. That is, although one "means" may be a computer code device, it may interact with another "means" that is a logic device.

The controlling computer 12 also includes a communications device 53 for communicating with the target device(s).

Such a device 53 may include (1) a modem for connecting via a telephone connection, (2) a wireless transceiver for wirelessly communicating, and (3) a wired adapter (e.g., an Ethernet or token ring adapter). In any of those configurations, the controlling computer 12 communicates with a target controller 50 using any selected communications protocol (e.g., TCP/IP, UDP, or RDP). In an alternate embodiment, the controlling computer 12 is a set-top box that receives the output of a target device via a television connection (cable or satellite) and enables the output to be displayed on a television or similar device (e.g., WebTV). Controlling computer 12 can likewise be a notebook, hand-held or palm-top computer.

In addition, more than one communications device 53 can be used simultaneously. For example, two or more communication devices may be combined in parallel in order to increase bandwidth. Moreover, separate adapters may be used for transmitting and receiving. Moreover, although the controlling computer 12 is illustrated as using a single communications channel, in an alternate embodiment, plural communications channels are used to communicate with plural independent target computers.

Commands or keystrokes entered at the keyboard 122 or mouse 124 of the controlling computer 12 operate to control the target computer 20 as if the command had been entered using a keyboard or mouse that is directly connected to the target computer 20. In addition, the monitor 120 of the controlling computer 12 displays the same video signals that are captured from the video adapter of the target computer 20.

Generally, a target controller 50 is a computer including at least one controller card. Each controller card is connected to one or more target devices (i.e., computer 20 or switch 74). Each controller card physically connects to at least one set of interfaces including: (1) a video interface 82, (2) a keyboard interface 84 and (3) a mouse interface 86. In an alternate embodiment, the keyboard and mouse are merged into a single interface (e.g., USB or Macintosh-style). (In an alternate embodiment, one or more interfaces may be wireless, and "connected peripheral devices" as used herein shall refer to wired and wireless peripheral devices.) In addition, the total number of target devices that are logically connected simultaneously may be even greater if the target device is a switch 74a (connected to several target computers 20) rather than a single target computer 20. Moreover, although each of the target computers 20a through 20c is illustrated as having separate housings, the present invention is not limited thereto. More than one target computer may be contained within a single case.

In the embodiment shown in FIG. 1A, the target controller 50 is implemented as a computer having similar components to the controlling computer 12. Those components include computer code devices for performing portions of the method of the present invention. In the embodiment of FIG. 1A, the target controller 50 includes at least one internal "plug-in" or "add-in" card labeled "Controller card 1." In an alternate embodiment, the target controller 50 includes at least one controller integrated onto the motherboard of the computer. In either of those embodiments, the target controller 50 optionally also attaches to local keyboard, mouse and video connections.

In yet another alternate embodiment, the target controller is a stand-alone device similar to a router or a switch. In the router/switch configuration, the keyboard, mouse and screen are not required and the router/switch is configured remotely—either through the communications device 53 or through a separate control interface (not shown). Remote configuration may be via a direct connection, a local area network or a wide area network (e.g., the Internet). In addition, the router/switch configuration may be updated through a removable medium (e.g., a floppy disk or CD-ROM) inserted into the router/switch. In the preferred embodiment, the target controller 50 is a computer system running Windows NT (or its successor Windows 2000) and is connected to at least one plug-in card. Alternate embodiments utilize Windows CE, UNIX, Linux or MacOS as the operating system.

Figure 1B:
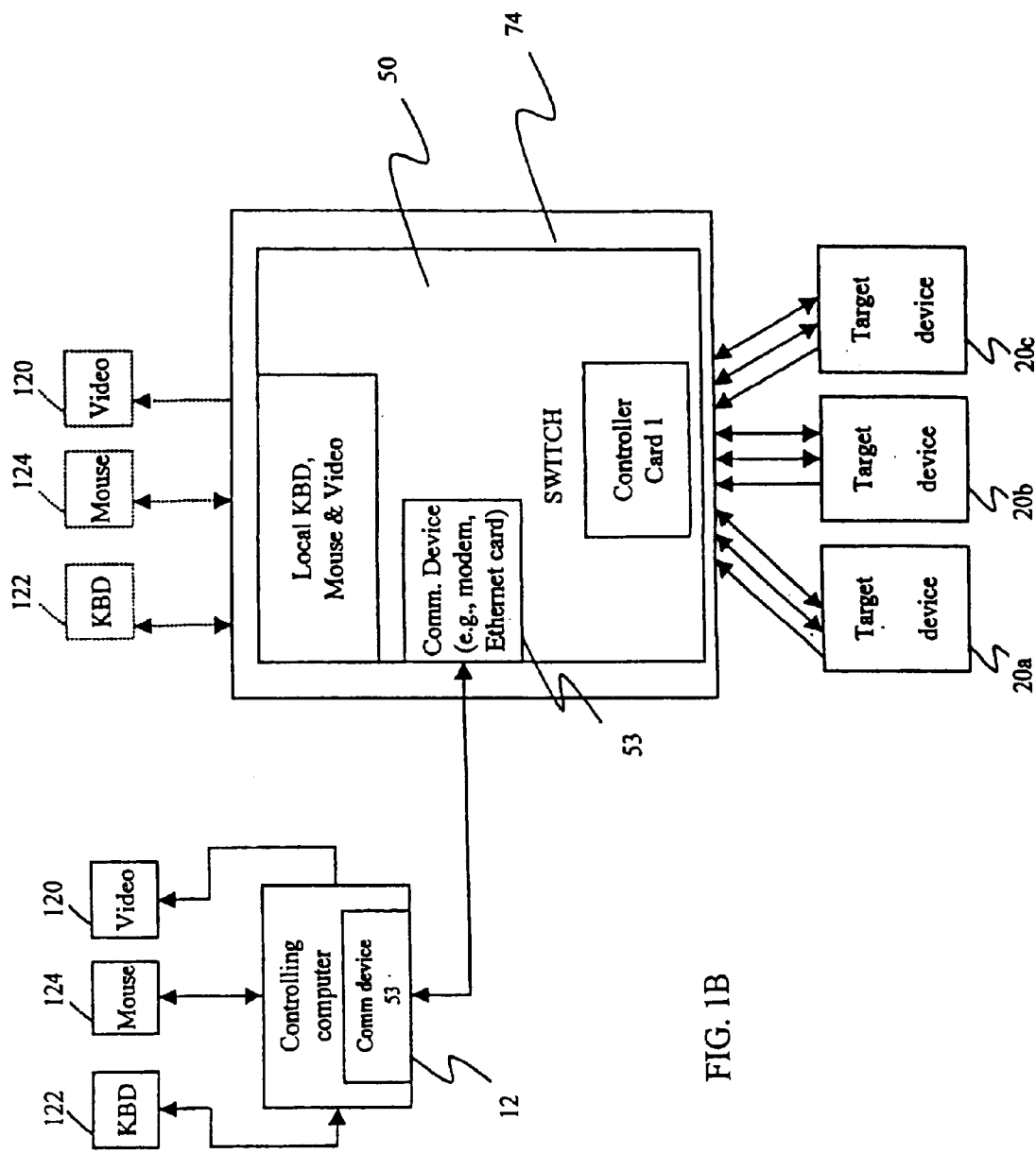
Figure 1C:
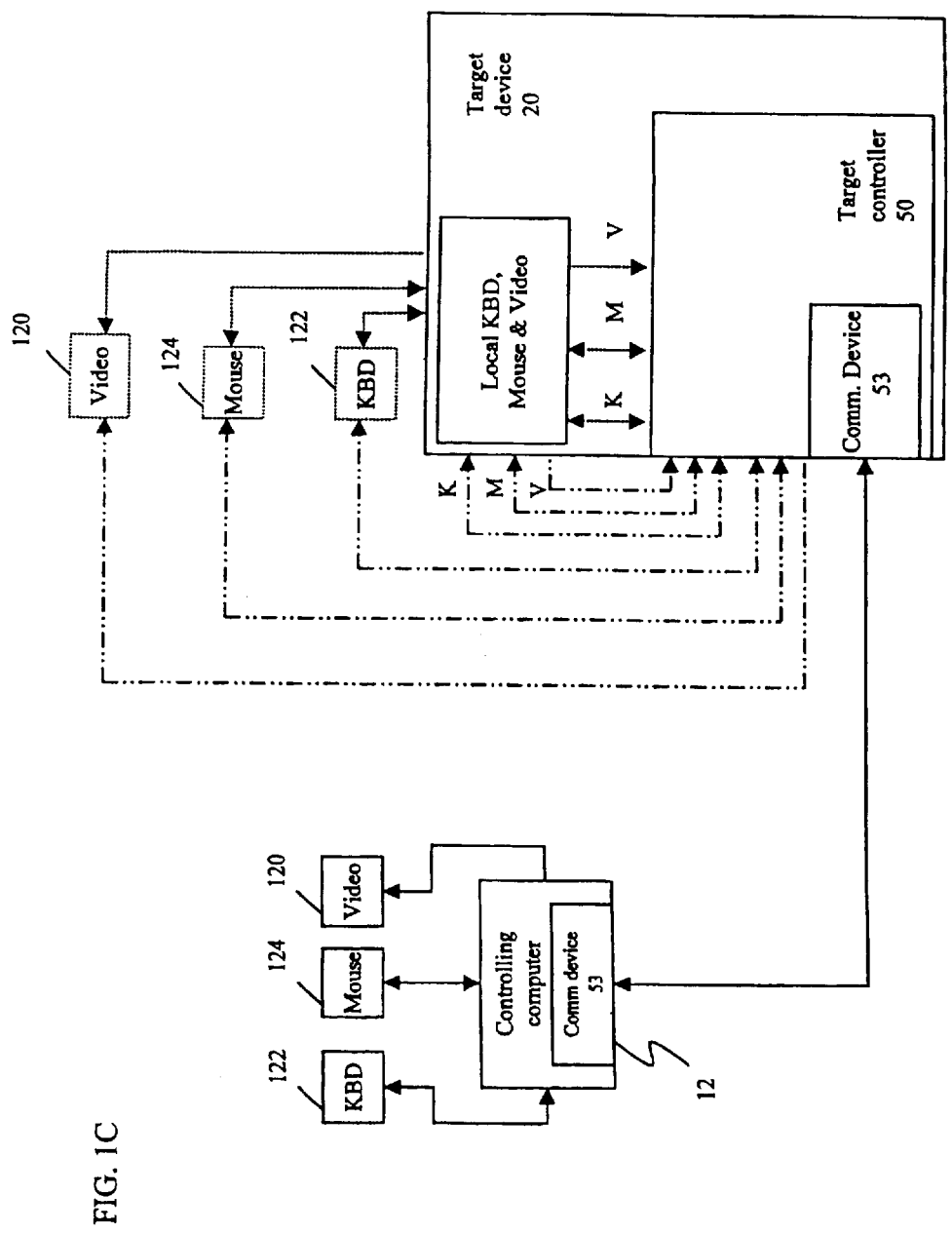

The target controller 50 can be further reduced and integrated into a KVM switch or into another target device (e.g., integrated on the motherboard of a target computer or included on a peripheral card of the target computer). Illustrative embodiments are shown in FIGS. 1B and 1C.

After configuration, the target controller 50 operates to capture the video output of the target device. The captured video signals are stored in either a frame buffer internal to the controller card or in a memory shared with other components of the computer. In addition, the controller card 50 fills a set of keyboard/mouse buffers internal to the controller card with keyboard and mouse commands to be sent to the target device. If the target device supports bi-directional mouse and keyboard communication, then the controller card also includes at least one buffer for receiving communications from those devices. Those commands are sent to the controlling computer 12.

The controller 50 includes a video digitizer that receives and converts the analog signals output by connected target device. The controller stores the converted signals in digital form in the video memory (shared with the mother board or dedicated to the controller card) as digital video data. After a configurable amount of processing, the digital video data is sent from the target controller 50 to the controlling computer 12. Based on the desired cost, complexity and performance of the controller, various processing tasks are divided between the hardware and software of the controller 50.

The initial starting point, however, is the pixel depth of the pixels to be rendered on the controlling computer 12. In order to determine that depth, a user must consider both the depth of the target device and the amount of available bandwidth between the controller 50 and the controlling computer 12. If the pixel depth being transferred is low but the pixel depth of the target device is high, then the ability to represent color gradations may be severely impaired. In fact, similar colors that are readily distinguishable on the target device may become indistinguishable on the display of the controlling computer. On the other hand, higher pixel depths require larger amounts of bandwidth to transfer and some loss of color separation may be acceptable.

In one embodiment of the present invention, the controller samples at eight bits per color, providing a 24 color sample. In another embodiment, the present invention samples at 5 bits per color to reduce the cost of the A/D converter. The samples are then converted into a bitmap in one of several formats: (1) 8(2) 16(3) 24 pixel, and (4) device independent.

Figure 3C:
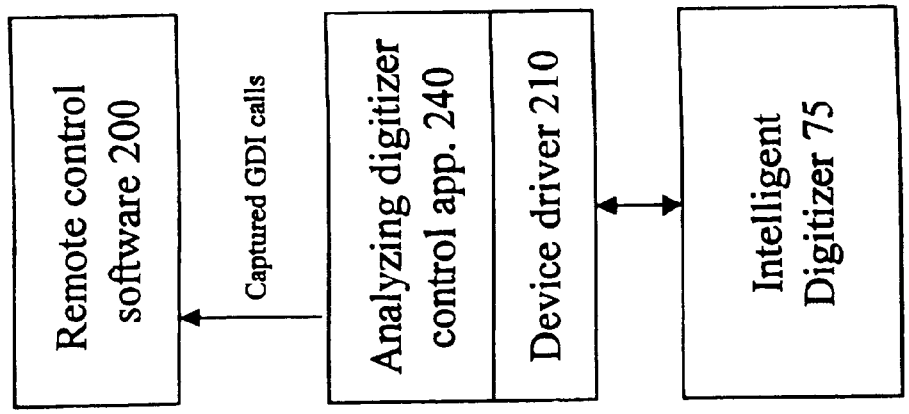
FIGS. 3a through 3c are block diagrams of the relationship between the software and the hardware of several embodiments of the present invention.
Figure 3B:
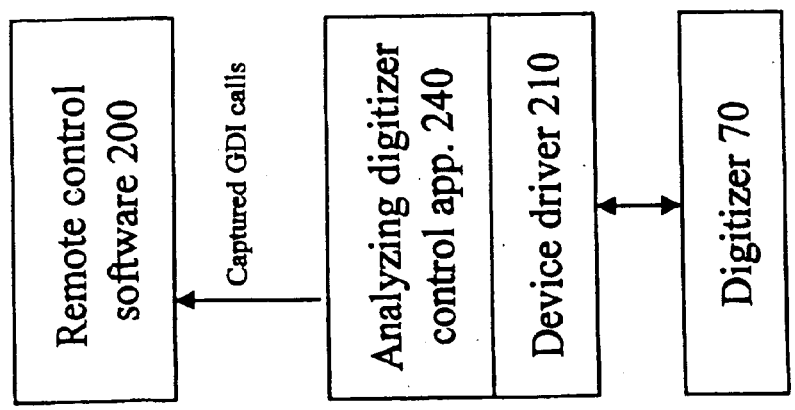
Figure 3A:
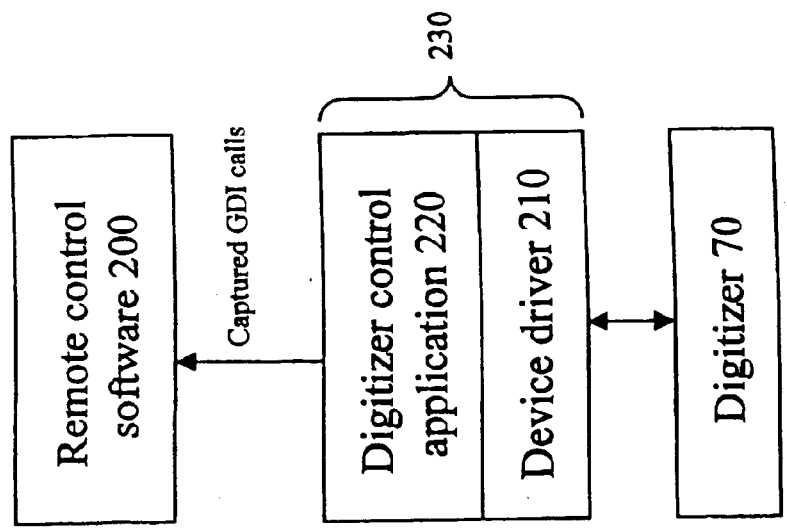

FIG. 3a illustrates that, in a first embodiment, the hardware (digitizer 70) and software 230 (including device driver 210 and the digitizer control application 220) of the controller 50 simply act as a thin interface to a remote control software application 200. When providing the thin interface, neither the software 230 nor the digitizer 70 performs any analysis on the video signals captured by the digitizer 70. Instead, the digitizer control application 220 periodically requests (through the device driver 210) that a whole screen of data be sampled. The digitizer control application 220 then draws the whole captured screen to its local screen using Windows GDI calls. The remote control software application 200 captures those GDI requests and retransmits them to the controlling computer 12. The client software on the controlling computer 12 then re-executes the commands so that the screen of the controller 50 and the screen of the controlling computer 12 show the same image.

Figure 4:
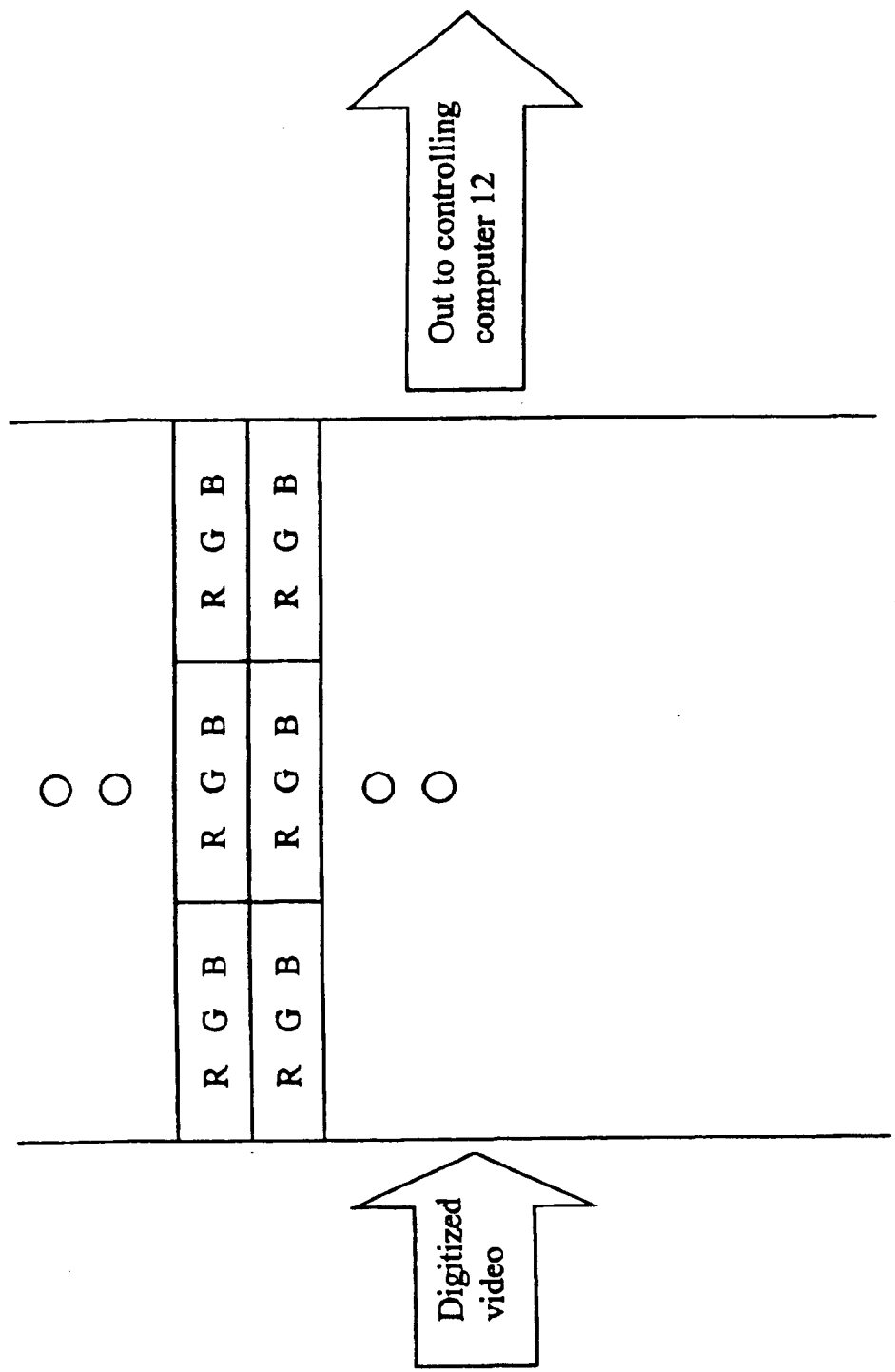
FIG. 4 is a schematic illustration of a series of uncompressed video signals representing the image generated by the video card of the remote computer.

An illustration of an exemplary method of storing the captured/digitized data is shown in FIG. 4. In that illustration, the red, green and blue components of each pixel are captured and stored together. In an alternate embodiment, the red, green and blue values are stored separately such that the red value for pixel number 1 is adjacent in memory to the red value for pixel number 2.

Several embodiments are possible for the storage and transmission of the digitized data. It is possible that the data is quantized at one depth (bits-per-pixel), stored at a second depth (greater or less than the quantized depth), and transmitted in a third depth. However, in an alternate embodiment, one or more of those depths may also be the same. In the case of quantizing at 5 bits per color (i.e., 15 bits per pixel), the 15 bits per pixel are converted into a device independent bitmap using 24 bits per pixel. Prior to transmission by LapLink or Carbon Copy, the 24 bits per pixel are converted to a "closest" color in the corresponding color palette (which may be 8 bits per pixel).

Although compression is not required, in this thin-interface embodiment, the preferred remote control software application 200 is LapLink by Traveling Software since, before transmission to the controlling computer 12, LapLink performs some analysis and lossless compression on the image resulting from the captured GDI calls. Accordingly, in that thin-interface embodiment, LapLink can be replaced by any other remote control application but preferably one that also performs lossless compression on the captured GDI calls before transmission.

In the second embodiment illustrated in FIG. 3b, the digitizer 70, the device driver 210, and the remote control software 200 remain consistent with their corresponding parts described in relation to FIG. 3a. However, the digitizer control application 220 of FIG. 3a is replaced by an analyzing digitizer control application 240. The analyzing digitizer control application 240 requests, through the device driver 210, that a screen be captured (i.e., digitized). Rather than using GDI calls to redraw the entire screen (which would be captured in its entirety by the remote control software 200), the analyzing digitizer control application 240 analyzes the captured image and uses GDI calls to redraw only changed blocks instead. Those changed blocks are captured by the remote control software 200.

Figure 5A:
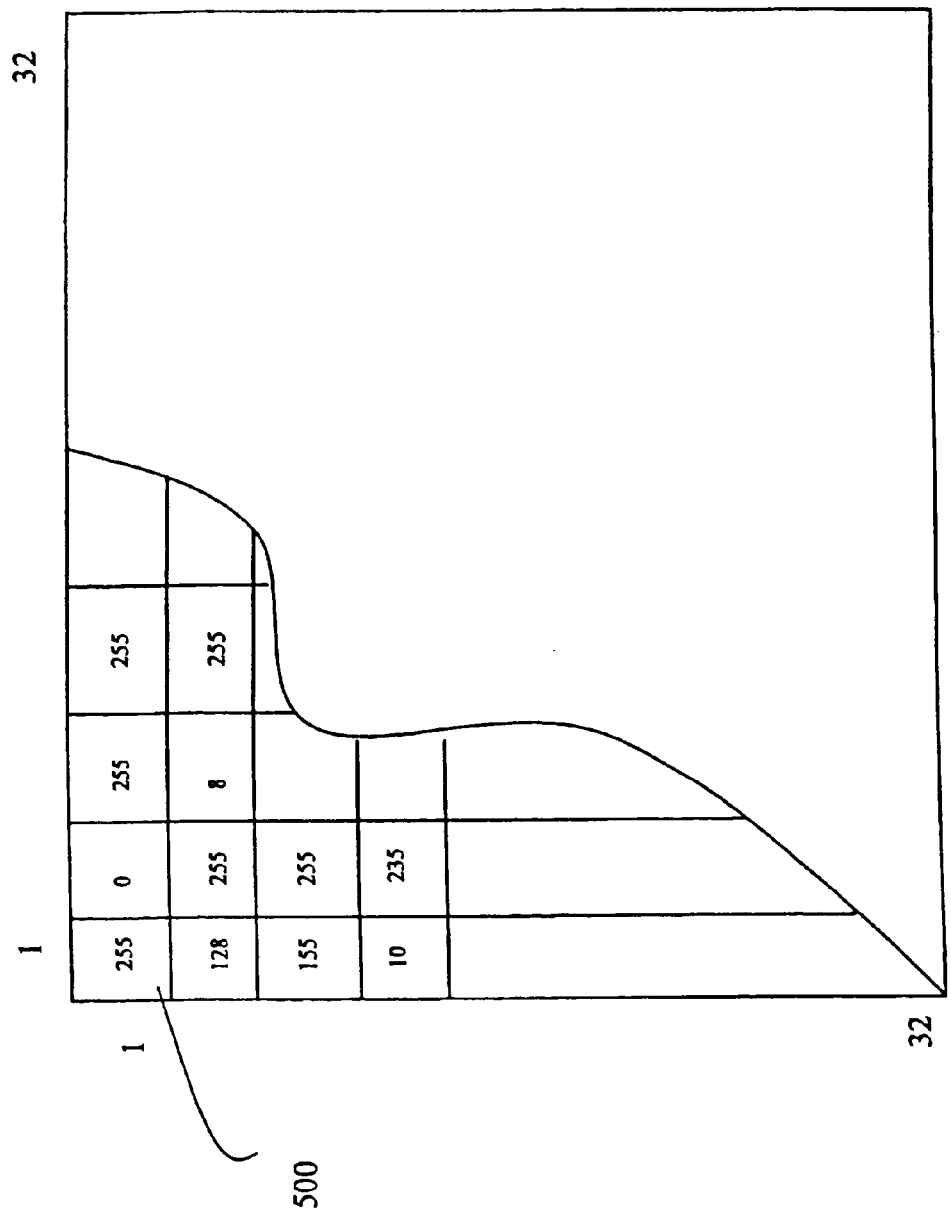
FIGS. 5A and 5B are graphical illustrations of the same block of the video memory of FIG. 4 between successive image captures by the system of the present invention.

For example, in the preferred embodiment of this implementation, the analyzing digitizer control application 240 partitions a screen into blocks (e.g., 32 pixels by 32 pixels), an example of which is shown in FIG. 5a. Although one embodiment uses fixed size blocks, an alternate embodiment uses blocks of varying size and shape. For example, where large blocks of the screen are a single color, the block size may be increased (e.g., to 64×64 or 128×32) in order to optimize solid block transmission, as is described in greater detail below. Although any size block can be used, other preferable blocks size are: 16×16, 6×32, 32×16, and 64×16.

For each block, the analyzing digitizer control application 240 determines if there is a more efficient way to draw a block. One method of drawing a block utilizes identification of solid blocks i.e., blocks of a single color. In many backgrounds, there exist regions that are a single color (e.g., all blue or all white). Once identified, those blocks can be more efficiently drawn by using a single GDI call indicating that a colored region is to be drawn at a particular (x, y) location on the screen. This method, however, requires that the CPU of the computer system perform the analysis of which blocks are a single color. In a high resolution, 1280×1024 screen using 32×32 blocks, for each screen update, the CPU checks 1280 blocks that are 32×32 pixels each.

The present invention may also identify "solid" blocks which are blocks that probably should have been a single color, but, through errors in digitization, are not exactly one color. The present invention can be configured to establish (1) a percentage threshold, (2) an intensity threshold or (3) both. The percentage threshold represents the number of errant pixels within a block that can deviate from the "solid" color, regardless of how far from the "solid" color they are, and still treat the block as a solid block. The intensity threshold represents the amount that any pixel can vary from the "solid" color before the block is considered not to be solid. By combining the percentage threshold and the intensity threshold, the system can limit both the number of errant pixels and amount of variation, simultaneously.

Improved performance is not, however, limited to identifying solid-colored blocks. The analyzing digitizer control application 240 can also improve efficiency by tracking which blocks change between successive screen captures. To track those changes, the analyzing digitizer control application 240 double buffers the digital video information received from the device driver. In this way, the analyzing digitizer control application 240 can compare (1) the screen information stored in a first buffer for a previous frame and (2) the screen information stored in a second buffer for the image currently being captured. The buffer sizes need not actually be the same sizes as long as the corresponding blocks can be compared in a non-destructive fashion such that the currently captured block can replace the corresponding block from the previous screen after comparison. Having identified the changed blocks, the analyzing digitizer control application 240 then need only redraw the changed areas as they change. The remote control software 200 then captures and transmits those changed blocks.

Figure 5B:
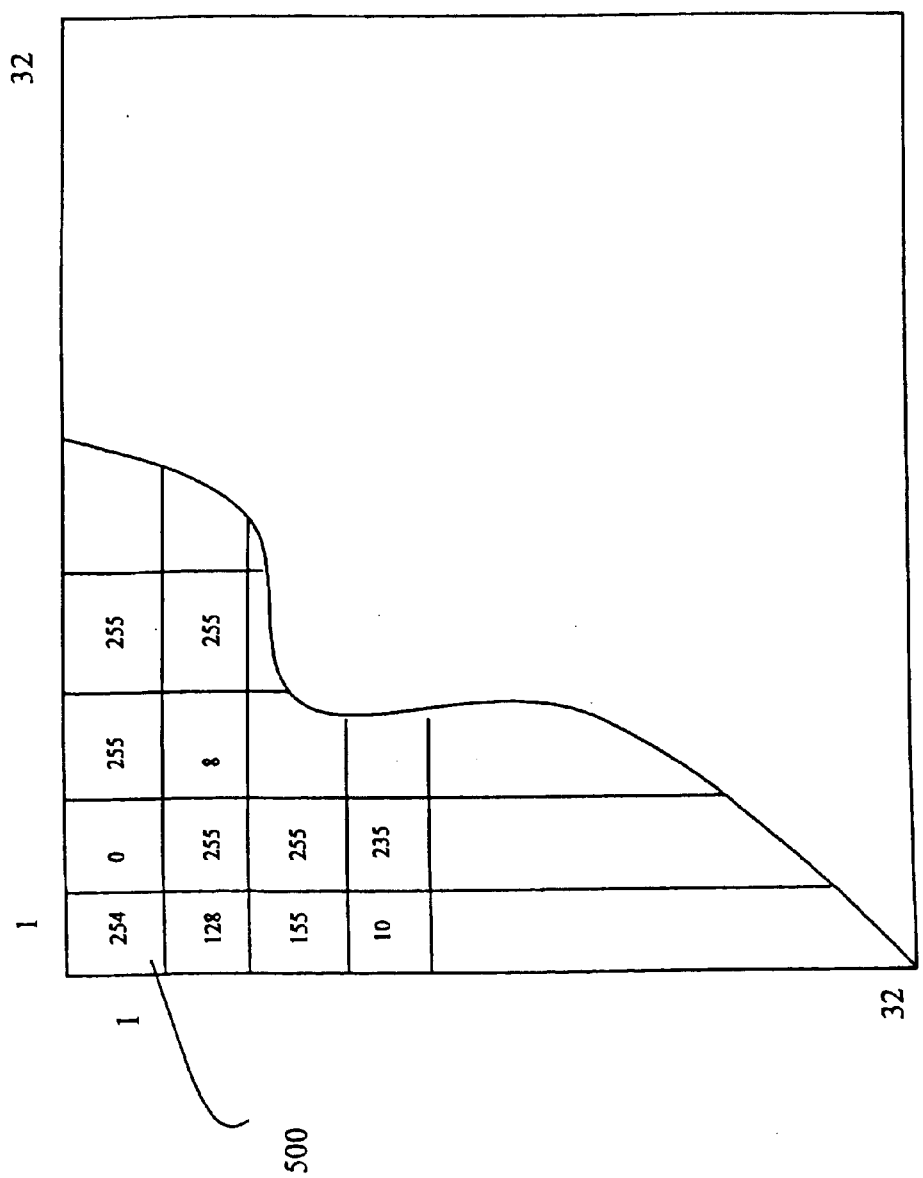

Unfortunately, as described above, the digitization/quantization process may introduce errors in producing digital data. Those errors not only affect the ability to identify solid blocks, those errors also cause blocks to appear as if they changed when the blocks have actually remained constant. For example, the memory block shown in FIG. 5A represents the data sampled during a first time period. The memory block shown in FIG. 5B represents the same block sampled during a subsequent time period. As can be seen, the value in location 500 has changed from 255 to 254. Without further analysis, it would appear that this block has changed. In the illustrated example, the change requires that the block be retransmitted. In all likelihood, the value would change back a short time later and the block would be retransmitted yet again.

To prevent such digitization errors from increasing the amount of data transferred between the target controller 50 and the controlling computer 12, in one embodiment of the analyzing digitizer control application 240, the analyzing digitizer control application 240 filters the sampled data to hide small changes. In a first filtering embodiment, the analyzing digitizer control application 240 stores both the filtered data from a previous image and an unfiltered copy of the previous image. The current image is then captured, stored and a filtered version of the current image is stored separately from the unfiltered version. (It will be appreciated by one of ordinary skill in the art that the entire current image and its filtered equivalent need not be stored. Rather, once the processing of a block (or group of blocks) is complete, the previous block is replaced by the current block, and the area for the "current" block is reused for the next block.) In one embodiment, a finite impulse response (FIR) filter averages the current pixel's value and the pixel value from the previous frame. That average is then averaged with the previous average from the previous frame. (Rounding (up or down) may be used in light of the division that is inherent in the averaging process.) The two filtered images are compared for changes. If there are changes, then the block is drawn, in either its filtered form or its unfiltered form.

In another filtering embodiment, the analyzing digitizer control application 240 stores a copy of the unfiltered block for a previously sampled screen and calculates differences between the unfiltered block and a currently sampled block. The differences are stored in a difference block, and the difference block is filtered and compared against a threshold (or compared against a threshold and then filtered) to determine if the new block (or portions thereof) should be redrawn. (It will be appreciated by one of ordinary skill in the art that the filtering step may be omitted if the use of a threshold is found to be sufficient to avoid quantization errors.)

In any of the above filtering embodiments, the analyzing digitizer control application 240 may actually inadvertently prevent small changes from being transmitted to the controlling computer 12 even when the changes are the result of an application's actions. To prevent the filtering and thresholding from impeding a user's ability to see those small changes, blocks that have changed (but that nonetheless have changed less than the threshold amount before or after filtering), may be sent (in whole or in part) when bandwidth is available. An area of interest may also be designated by the user such that the system ignores changes to sampled data in the area outside of the area of interest.

In one embodiment of the present invention, the filtering of blocks is changed dynamically. For example, the threshold levels may be increased when the user wants to decrease network traffic. In addition, in an alternate embodiment, the system includes a percentage threshold that causes a block not to be treated as changed as long as a total number of pixels within the block that have changed is less than the threshold regardless of how much those pixels have changed. As a result fewer blocks are treated as "changed" and fewer drawing requests are made. Likewise, the system may change from one block size to another or from one filter to another.

Figure 6:
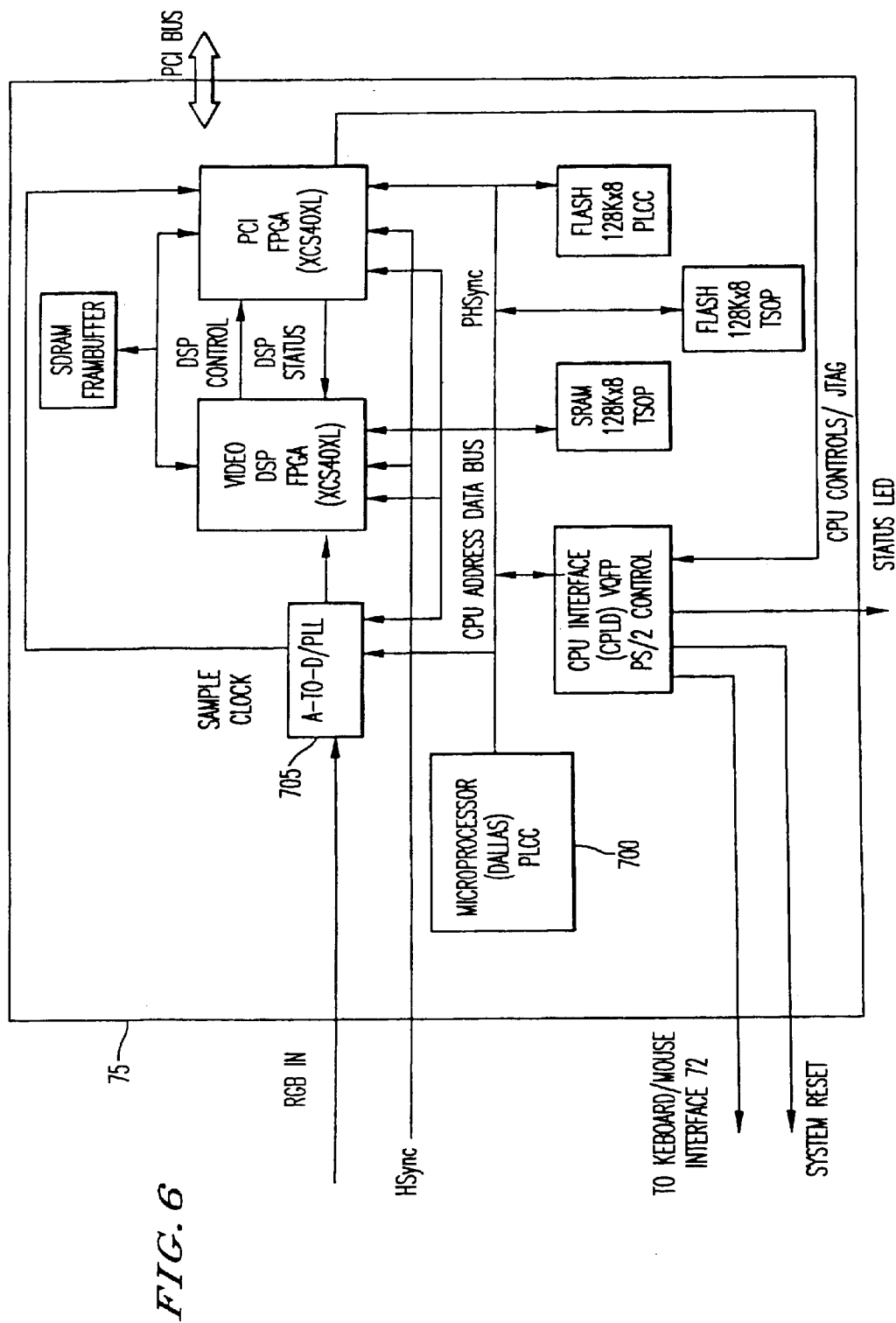
FIG. 6 is a schematic illustration of one embodiment of an intelligent video digitizer as shown in FIG. 3c.

The filtering and thresholding process described above with reference to the analyzing digitizer control application 240, may likewise performed (wholly or partially) in hardware as part of an intelligent digitizer 75 shown in FIG. 3c. The intelligent digitizer 75 is shown in greater detail in FIG. 6. The video A-to-D/PLL 705 is a triple high speed Analog-to-Digital Convertor that contains an integrated PLL, and a serial digital interface for setting individual registers (e.g., registers controlling control the pixel clock and clamping settings). The input signal used by the PLL is the polarized HSYNC (PHSync) signal. This is then multiplied by the value set in one of the internal registers to produce the desired pixel clock frequency. The output is then provided to the Video DSP and PCI FPGAs in order to capture video at the required pixel clock rate.

Figure 10:
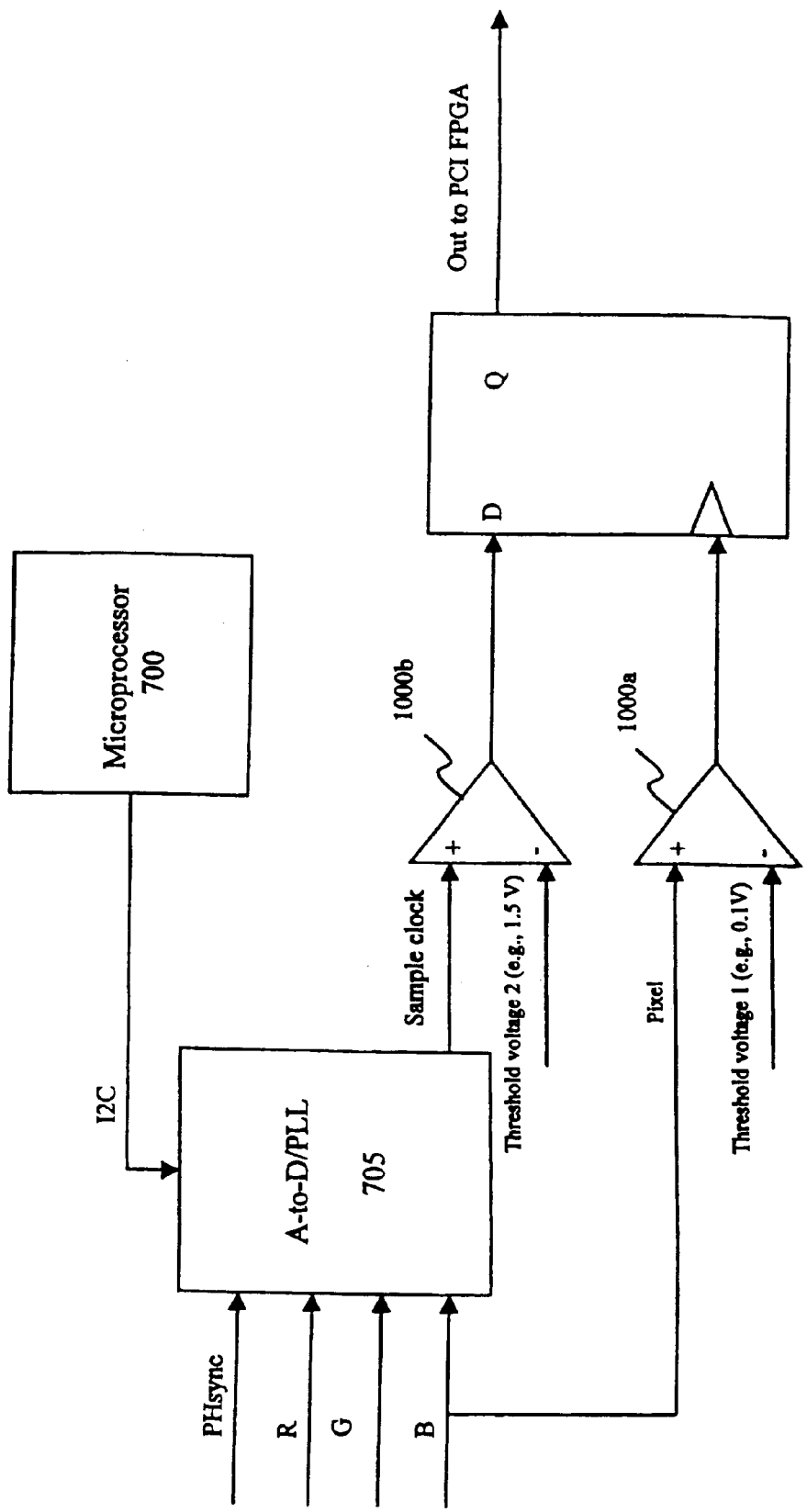
FIG. 10 is a block diagram of a circuit for altering the phase of when pixels are sampled.

In one embodiment of the present invention shown in FIG. 10, the system adjusts when the pixel is sampled by adjusting the phase of the A-to-D convertor 705—i.e., the delay between the active edge of the PHSYNC signal as compared to the first active edge of the sample clock after the active edge of the PHSYNC signal. As shown in FIG. 10, in the preferred embodiment, the blue signal from the RGB inputs is used as the positive input to the comparator 1000a. In alternate embodiments, the red or green signal may be used. In yet another embodiment, two or more of the color signals are combined to form the positive input. As shown in FIG. 10, the blue signal is filtered by applying a low threshold signal to the negative input of the comparator 1000a. The filtered blue signal then acts as the clock input of a D flip-flop 1005. The output of the A-to-D converter 705 is the sample clock (shown in FIG. 6), which is also applied to the D input of the D flip-flop 1005. The output of the D flip-flop is fed out to the PCI FPGA where its status can be read by the analyzing control application 220 as if the output were part of a register of the FPGA. In the preferred embodiment, the D flip-flop is included in the CPU Interface CPLD.

In order to control the phase, the analyzing control application 220 reads the status of the output of the D flip-flop 1005 (e.g., once per frame). When the output is a 1, the delay of the A-to-D convertor 705 is moved one unit in a first direction by sending a command to the microprocessor 700 (which then adjusts the delay using the 12C bus). Conversely, when the output is a 0, the delay is moved one unit in a second direction opposite the first direction. In the A-to-D convertor 705 of the preferred embodiment, each unit corresponds to approximately 11 degrees. In light of this circuit and the fact that the delay is reprogrammed, the system will oscillate between reading a status of 1 and 0. This causes the beginning of pixel data to correlate with the trailing edge of the sample clock signal. As such, the next rising edge of the sample clock signal will be at the center of the period in which the blue signal (and the red and green signals) hold valid data.

In an alternate embodiment, additional smoothing logic (either hardware or software) is used to slow down the changes in phase. Rather than toggling between shifting forward and shifting backward, at each sample, the logic can decide to forego a change after a status read. In order to decide when to change, a running average (or other filtering function) can be used to determine the effect of changing or not changing.

The A-to-D/PLL also has a number of internal registers that allow the board to have control over the phase relationship of the input signals and the output clock signal. This allows adjustments to be made on the sampling clock to ensure that the input signal is sampled on the optimal location and minimize jitter caused by sampling during transition. It also has settings for adjusting the voltage level offset and gain to allow for adjustment due to level shifting and attenuation over the video cable. In the preferred embodiment, the A-to-D/PLL is the Philips TDA8752H/8 a triple high (100 MHz) analog to digital converter. It contains all of the phase-locked-loop circuitry necessary to generate the pixel clock from the Horizontal Sync signal. The TDA8752 has numerous control registers that are set by the microcontroller via an 12C interface.

One set of possible resolutions that can be used by the present invention is shown in Table 1 below.

TABLE 1

COMMON VIDEO MODES DEFINED

| Resolution. | Vert. Freq. | Horiz Freq. | Lines/Frame | Pixels/Line | H/V Level | PCLK Modulus | PCLK Freq. |
|---|---|---|---|---|---|---|---|
| DOS | 70 Hz | 31.5 KHz | 450/??? | ???/??? | LOW/HIGH | | |
| 640 × 480 −60 | 60 Hz | 31.5 KHZ | 480/525 | 640/800 | LOW/LOW | | 25.175 MHz |
| 640 × 480 −72 | 72 Hz | 37.9 KHz | 480/520 | 640/832 | LOW/LOW | | 31.500 MHz |
| 640 × 480 − 75 | 75 Hz | 37.5 KHz | 480/500 | 640/840 | LOW/LOW | | 31.500 MHz |
| 640 × 480 − 85 | 85 Hz | 43.3 KHz | 480/509 | 640/832 | LOW/LOW | | 36.000 MHz |
| 800 × 600 − 58 | 56 Hz | 35.1 KHz | 600/625 | 800/1024 | HIGH/HIGH | | 36.000 MHz |
| 800 × 600 − 60 | 60 Hz | 37.9 KHz | 600/628 | 800/1056 | HIGH/HIGH | | 40.000 MHz |
| 600 × 600 − 72 | 72 Hz | 48.1 KHz | 600/666 | 800/1040 | HIGH/HIGH | | 50.000 MHZ |
| 800 × 800 − 75 | 75 Hz | 46.9 KHz | 600/625 | 800/1056 | HIGH/HIGH | | 49.500 MHZ |
| 800 × 600 − 85 | 85 Hz | 53.7 KHz | 600/631 | 800/1048 | HIGH/HIGH | | 56.250 MHz |
| 1024 × 768 − 60 | 60 Hz | 48.4 KHZ | 768/806 | 1024/1344 | HIGH/HIGH | | 65.000 MHZ |
| 1024 × 768 − 70 | 70 Hz | 56.5 KHz | 788/806 | 1024/1328 | HIGH/HIGH | | 75.000 MHZ |
| 1024 × 768 − 75 | 75 Hz | 60.0 KHZ | 768/800 | 1024/1312 | HIGH/HIGH | | 78.750 MHz |
| 1024 × 768 − 85 | 85 Hz | 68.7 KHz | 768/808 | 1024/1376 | HIGH/HIGH | | 94.500 MHz |

As would be appreciated by one of ordinary skill in the art, other resolutions are possible. The determination of other possible modes may be aided by reference to VESA and Industry Standards and Guidelines for Computer Display Monitor Timing, Version 1.0, Revision 0.7, Revision Date: Dec. 18, 1996, the contents of which are incorporated herein by reference.

In addition to the above factors used to control video modes, the system of the present invention also controls when sampling begins following an (P)HSYNC signal or a VSYNC signal. The time from signal to first sample is called the "front porch." If sampling after an (P)HSYNC signal begins too early (i.e., the front porch is too short), the system will sample "black" pixels prior to the real left edge of the display. If sampling after an HSYNC signal begins too late (i.e., the from porch is too long), the system will miss sampling the beginning pixels of the display. Similar problems exist for timing with relation to the VSYNC signal. Accordingly, the present invention provides the ability to set the front porch.

In one embodiment of the present invention, the front porch is set manually through user intervention typically through a trial and error process. In three automated embodiments, the system of the present invention provides automatic determination of the front porch when a non-black background is used. In the first automated embodiment, the right edge of the screen is used as a reference. Thus, the system uses an initial front porch value, counts out the number of pixels in a row, and then determines if the pixel after the end of the row is black or colored. If that pixel is black using the initial front porch value, then the front porch value is shortened and the counting process is repeated. This shortening process is repeated until a non-black pixel is found in iteration I. Then the front porch value is reverted to the front porch value in iteration I−1 i.e., to the front porch value in the previous iteration. On the contrary, if the pixel is colored when using the initial front porch value, then the front porch value is increased until a black pixel is found at the end of a row in iteration I. The front porch value is then reverted to the delay value in iteration I−1 i.e., to the front porch value in the previous iteration.

In the second automated embodiment, a process similar to the first automated embodiment is used, except that the beginning of the row is analyzed. If the beginning of the row is found to be black, then the front porch value is increased until a non-black pixel is found in iteration I. Conversely, if the beginning of the row is found to be colored, then the front porch value is decreased until a black pixel is found in iteration I. Then the front porch value is reverted to the front porch value in iteration I−1.

In a third automated embodiment, the processes of the first and second automated embodiments are combined thereby checking the left and right edges. In this manner, the correct number of pixels per line can also be automatically determined. A similar process can be performed for the vertical delay looking at (1) the top row, (2) the bottom column, or (3) the top and bottom columns.

The Flash memory component(s) contains all non-volatile data required to enable the onboard microprocessor to control operation of the intelligent digitizer 75. Flash information includes: (1) Microprocessor Program/Backup/Boot code and (2) a PCI FPGA Initialization Bitstream. If sufficient free memory space exists on the Flash, then the Flash also contains backup copy of the last correctly programmed PCI FPGA Initialization Bitstream. This enables the digitizer 75 to be reloaded in case of an error in programming. One embodiment of the Flash configuration uses one PLCC Flash device with a TSOP Flash device soldered on the board.

In one embodiment of the Flash memory device, the memory is physically addressed as a single large memory device. In an alternate embodiment, the memory is physically divided into pages that can be used as the microprocessor decides. By setting the page bits in a page register, the system can change from one page to another. For example, using two page bits, 00=page 0, 01=page 1, 10 page 2, and 11=page 3. As the number of page bits increases, the number of independently addressable pages increases. This aids in providing a larger accessible memory to those microprocessors that have small address bus sizes.

The SRAM component contains both User Data to be used for general purpose RAM and program data when the microprocessor needs to run the program from RAM. In one embodiment of the SRAM memory device, the memory is physically addressed as a single large memory device. In an alternate embodiment, the memory is physically divided into pages as described above.

The CPU Interface CPLD is intended to provide all of the CPU's address/data bus interfacing signals including the chip selects to memory, the FPGA, and any external signals that need to be read from MMIO. By way of a non-limiting example, the FPGAs, CPLD and SDRAM run off a 3.3 volt power supply. The other components may use the same or different supply voltages.

The PCI FPGA provides the communication interface between the CPU of the computer and the local microprocessor 700 onboard the controller 50. Thus, the PCI FPGA receives requests sent by the device driver 210. It also provides access to the video buffer and supporting registers (e.g., bit change, block status). Although depicted as an FPGA, one of ordinary skill in the art would appreciate that the communication interface also can be either an application specific integrated circuit (ASIC) or a one-time programmable (OTP) circuit if the interface does not need to be field updated. The interface provides the following features (through the device driver 210): (1) re-programming the CPLD over a JTAG interface; (2) detecting video presence; (3) detecting video resolution parameters; (4) initializing the frame buffer; (5) polarizing sync signals; (6) controlling the Video DSP FPGA; (7) resetting the components of the controller 50; and (8) setting the active video parameters.

The Video DSP FPGA performs most of the video signal processing required to capture, filter, detect changes in frames, and store the video in a frame buffer (e.g., a SyncDRAM memory device). The PCI FPGA controls operation of the video DSP including any modes that the video DSP has for capturing video.

By providing separate programming interfaces for the two FPGAs, the video DSP FPGA can be updated without reprogramming the PCI interface that interfaces directly with the PCI bus.

The microprocessor of the controller controls most of the local data flow on the controller 50. That microprocessor performs: (1) Basic system testing (e.g., code checking, FPGA checking, and RAM testing), (2) transferring mouse and keyboard signals, (3) downloading new programs or FPGA boot code; (4) initializing the onboard FPGAs; and (5) communicating with the analog-to-digital converter to control pixel clock settings (e.g., phase and frequency) and video settings (e.g., color offsets). The microprocessor may act as a watchdog timer to ensure that the system is running properly. If the system is not running properly, the microprocessor can then reset the system.

When the controller is first powered on, a power-on reset is performed internally by the CPU. (The RESET pin is held low at power-up by a pull-down resistor until the FPGA is booted. Once booted, the FPGA will drive the signal low unless a reset is asserted by the application). Later, the controller 50 may be reset by receiving a command from the communication interface. This signal forces a hardware reset to the microprocessor and resets the CPU and all registers to a known state. The controller 50 may be partially or completely reset by using commands to perform: (1) a CPU reset, (2) a CPLD reset, or (3) a video DSP reset. The CPU Reset resets the CPU and the CPLD interface logic to the CPU. This allows the application to set the CPU and any logic that will affect the operation of the CPU to a known and initial state. In addition, the CPU may have the capability through independent logic to cause a self-reset.

The CPLD reset resets the additional circuitry that does not interface to the CPU. The logic that allows the CPU to reset itself functions independently from the interface logic. In addition, the Video DSP Reset allows either the application or CPU to reset the internal logic of the Video DSP FPGA to either recover from a locked-up or to re-initialize any internal logic that needs to be set to a known state. Preferably, all of the reset signals are active high and are tri-stated with a pull-down resistor. This allows multiple sources to signal a reset without causing contention. An active high reset provides consistency with the CPU's reset polarity.

When the controller 50 determines that the target device is a target switch rather than a target computer, the controller can provide additional functionality specific to the switch. The controller can provide "thumbnail" images of target computers connected to a target switch to allow many target systems to be displayed at the same time, shown in miniature. The control applications (220 and 240) utilize a multi-window architecture (e.g., the Multiple Document Interface (MDI)) to support control for multiple target devices. When a target computer's window gains focus, the target controller 50 automatically sends the appropriate keystroke sequence (e.g., "<PrtScr>+number+<Enter>") to the switch to select the corresponding switch port of that target computer. When the mouse and keyboard have been inactive for a specified time interval, the controller will optionally enter a scan mode. In this mode, the target-system windows are updated in a repeating sequence. To update each of the target computers, the controller card sends a switch command (i.e., a keystroke sequence (e.g., "<PrtScr>+number+<Enter>")) to select the next target device. The video output of that target device is then sampled, and the sampled image is written using GDI calls. Any mouse or keyboard activity cancels scan mode, and only the selected target window continues to be updated.

In one embodiment of the system of the present invention, the user (with the help of a configuration file or configuration "wizard") manually establishes the correlation between the name of a system and its switch/port number. In light of the fact that this manual process can be cumbersome, especially when switched are tiered in a hierarchy, an alternate embodiment utilizes an automated configuration process. In that embodiment, the switches utilize one of the keyboard or mouse ports or a separate dedicated communications port to pass information from the target devices or switches up to the target controller 50. In yet another embodiment, the target controller 50 receives configuration information from a network computer about the port/switch configurations.

In a more secure embodiment, the present invention includes security features to restrict the computers that can be viewed or accessed (or both) by the remote control software. For example, using this security, one user may only be able to view target computers on switch ports 1 and 3 while another user can view and interact with computers on switch ports 1 and 2. In this manner, the system of the present invention can provide monitoring capabilities to less trusted individuals and full access to other, trusted individuals.

In an alternate embodiment, two or more different users may connect to the same controller 50. In this embodiment, the two or more users may control different controller cards or may share access to the same controller card. In this embodiment, the captured GDI calls for a controller card are routed to the appropriate remote control software. Likewise, a user may be connected to multiple controller cards on one or more computers simultaneously. In that case, the user can monitor and control several target devices simultaneously.

Figure 7A:
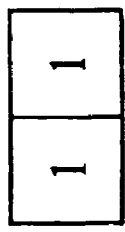
FIGS. 7a and 7b are block diagrams showing status registers indicating the status of blocks of the screen.

Additional processing performed by the intelligent digitizer 75 is the analysis of the blocks. As shown in FIG. 7a, the system maintains at least two status bits per block, although other status bits are also possible. The first status bit indicates which blocks have changed (either with or without filtering). This bit acts as a "dirty" bit in a cache. This bit can be separated into two bits if the system is to track which blocks have changed at all versus which blocks have changed more than the threshold. This threshold may be (1) global for the whole screen or (2) specific to particular blocks. Moreover, this threshold may be updated dynamically either (1) at a user's request or (2) in response to an automatic adjustment of parameters to change performance characteristics.

The second bit illustrated indicates whether the corresponding block is a single color. As described above, if the block is a single color, then the block can be compressed by redrawing the block as a single GDI call, as discussed above.

As also discussed above, blocks can be compared for similarity to other blocks. Although not shown in the status fields of FIG. 7a, the status fields can include a reference to another block to which the current block is equal.

Figure 7B:
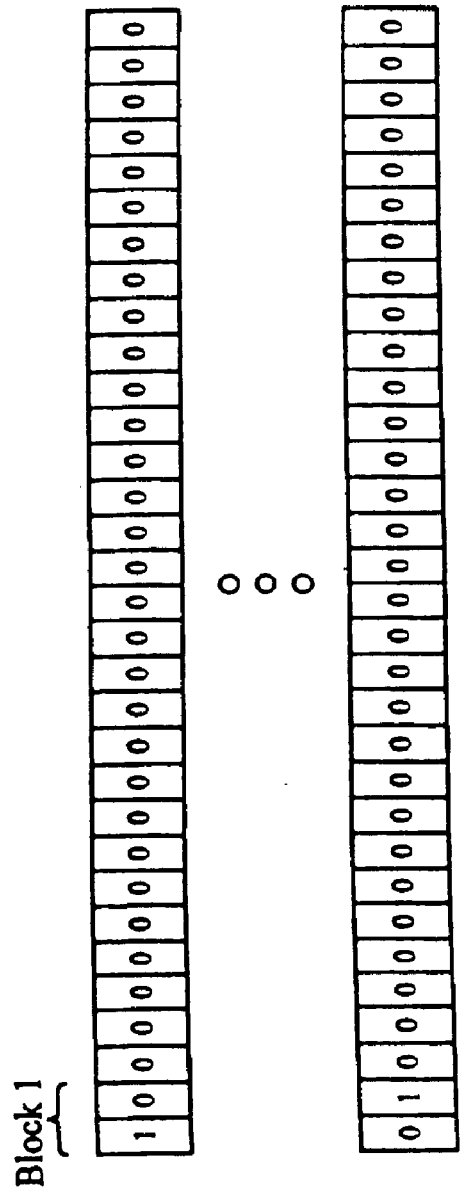

FIG. 7b shows a memory area that can be read by the microprocessor of the controller to determine which blocks have changed or are a single color. If additional bits of status information per block were used, the entry for each block would be widened by that number of bits.

Figure 8:
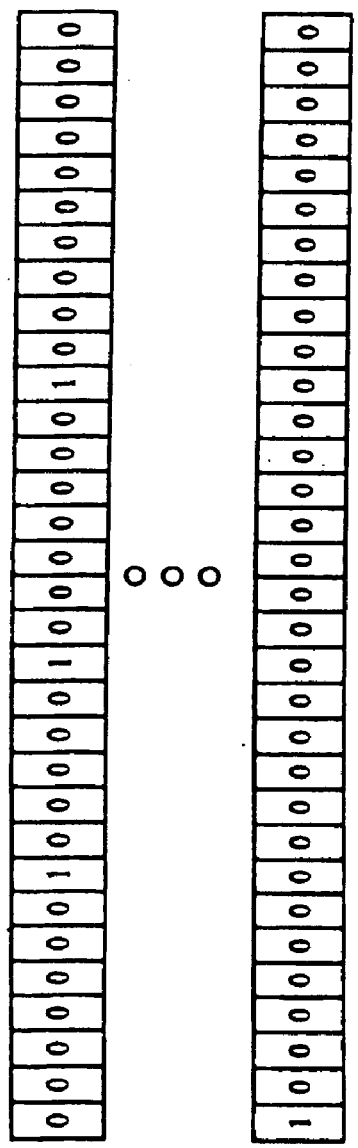
FIG. 8 is block diagram showing status flags indicating which bits in a block have changed.

In addition to indicating whether a block has changed, the intelligent digitizer 75 can also, in hardware, track which pixels within a block have changed. When tracking which pixels have changed, a memory area, as shown in FIG. 8, is assigned to each block. The analyzing digitizer control application 240 can then read from memory the changed bits and determine if individual pixels should be redrawn of if the block should be redrawn in its entirety. By reading the first 32 bits of that memory and comparing with zero, the system can determine if any pixels in that line have changed. If not, the next line can be processed. In an alternate embodiment, the hardware contains a separate register for each block which identifies which lines within the block have changed. In this way, the system can quickly identify the lines that contain changed pixels.

Although the above description has focused on the normal operation of the present invention, the processing of the system may be paused when a user is temporarily uninterested in the changes on the target device. The analyzing digitizer control application 240 freezes its status in response to a message from the controlling computer. If the user has minimized the screen representing the target device on the monitor of the controlling computer 12, then real-time updates of changes to the screen are not necessary. The internal buffers of the controller 50 that represent the last screen sent to the controlling computer 12 are no longer updated—i.e., they are frozen. However, the buffers representing the sampled video signals from the target device continue to be overwritten. The system then continues to track which blocks have changed in comparison to the frozen blocks—not in comparison to a previously sampled blocks. When the screen is re-enlarged, the controller 50 is unfrozen and the changes are sent back to the controlling computer 12.

Thus, until the screen is un-minimized, the bandwidth that would have been used to send the changes (which would not have been seen) is saved. This is especially important when simultaneously monitoring multiple target devices over a lower-bandwidth modem connection. This method of performing comparison with the frozen blocks still allows the analyzing digitizer control application 240 to inform the controlling computer 12 of how many blocks have changed without having to send those changes. Thus, the minimized icon on the controlling computer that represents the target device may flash or an audio signal may be played to inform the user that a major change to the screen has occurred.

In light of the inherent delay in the transmission process, the digitized mouse pointer on a target computer may be updated too slowly to allow accurate control of the mouse. As a result, the controlling computer 12 generates a pseudo-cursor (e.g., a set of cross-hairs) that indicates where the digitized cursor should be. To initialize this process, the digitizer control application 220 (or the analyzing digitizer control application 240) sets the cursor of the target computer to a known location. For example, by sending to the target computer a series of mouse commands, it is possible to drive the cursor to the upper left hand-corner (the 0, 0 corner), no matter where the cursor was prior the series of commands. The original cursor is then forced back down to be aligned with the cross-hairs.

As the mouse commands are received by the digitizer control application 220 (or the analyzing digitizer control application 240), they are processed and passed on to the target device (which updates its local cursor). In order to avoid overloading the target computer with mouse packets, the digitizing control application 220 can queue mouse commands and send those mouse commands as a group. Alternatively, the digitizer control application 220 (or the analyzing digitizer control application 240) can completely filter out a series of mouse movement events. To reproduce the effect that the filtered commands would have had, the system periodically samples the mouse position and sends, to the target controller, a mouse movement command representing the difference between the new position and the previous mouse position.

If the mouse pointer generated at the target controller 50 ever becomes out of alignment with the pointer generated on the target computer, the user can reset the pointers using a hot-key. Like during initialization, the target computer is then sent a series of mouse commands to move the pointer to a known location and then from the known location to the position consistent with the cross-hairs drawn by the digitizer control application 220 (or the analyzing digitizer control application 240). When the window of the digitizing control application 220 has the focus, this re-synchronization process is also performed when the mouse enters an active window of the digitizer control application 220 (or the analyzing digitizer control application 240).

The above discussion has described the present invention in terms of remote control software 200 and an analyzing digitizer control application 240 that are separate software programs. In an alternate embodiment, the functionality of those two programs is more tightly integrated through the use of an API to communicate between them, or by combining the two into a single application. In this tighter integration, the analyzing digitizer control application 240 can transmit the changed blocks to the remote control software 200 in either compressed or uncompressed format. One example of a compressed format is a differential format in which a change flag indicates whether or not each pixel (or line) has changed. Then, the compressed block includes only the values within the block that have changed. Thus, the number of bytes to transmit is reduced as long as the overhead of the flags is less than the number of bytes saved by not transmitting those unchanged pixels in the block.

Figures 9A, 9B:
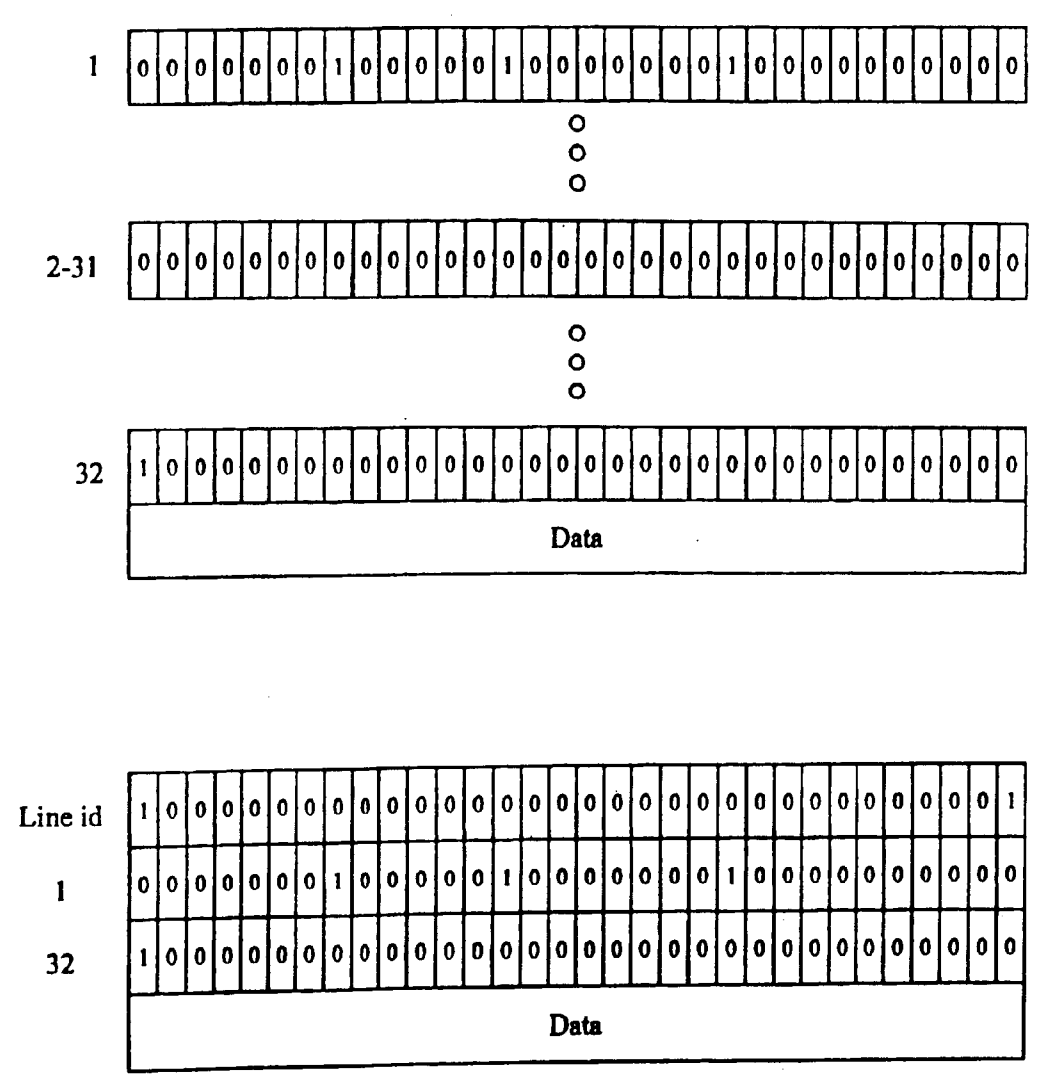

One implementation of such a compression header is shown in FIG. 9a. The header consists of 32 words that are each 32 bits—one bit for each pixel. As shown in the first line, three pixels in the first 32 pixels are changed. No other pixels in blocks 2–31 are changed, but in the last line, one additional pixel has changed. The data for the four pixels then follows the header.

A second implementation of the compression header utilizes a block header which indicates which lines have changed. The header indicates that only the first and last lines have changed, so the bit flags for those lines are included without including the bit flags for the unchanged lines.

Another compression technique used in an alternate embodiment includes encoding a block as (1) a reference to a known block (not necessarily the block from the previous screen capture) and (2) the changes that must be made to the referenced block in order to generate the current block. For example, if the background of an application changes, then all blocks identified as part of the background can be changed by simply referencing the first background block. If a portion of the block was not background, then only those parts that are not the background need to be encoded in the block. This technique similarly works for blocks that are almost completely one color. The block is simply encoded as (1) the background color of the block and (2) those pixels that are different from the background color.

In an alternate embodiment, in order to provide even further compression, blocks are compressed using intra-block compression. For example, a block may be compressed using run-length coding (with or without end-of-block markers) or Ziv-Lempel-Welch (LZW) encoding.

Although the target controller 50 has been described above as performing only the screen capture functions, that target controller 50 can provide additional functionality as well. The digitizer control application 220 and the analyzing digitizer control application 240 can be minimized so that the user can access the other programs stored on the target controller 50. As such, the target controller 50 can be used to configure the network, cycle power to individual computers (20a to 20c) and any other function that can be performed on computer to which a user is connected. It is even possible that the target controller 50 be connected to one of the switches that it samples.

In yet another embodiment of the present invention, the system captures outputs to a digital display rather than an analog display. In that embodiment, it is not necessary to convert from analog to digital format. The system simply buffers and analyzes the video data as if it were sampled data.

Obviously, numerous modifications and variations of the present invention are possible in light of the above teachings. It is therefore to be understood that, within the scope of the appended claims, the invention may be practiced otherwise than as specifically described herein.

What is claimed is:

1. A computer for interacting with a remote target controller that captures video from at least one of an external target switch and an external target computer and transmits only pixel values that changed between first and second blocks of the video, the computer comprising:

a communications device for receiving the video from at least one of an external target switch and an external target computer;

a processor for processing the only pixel values that changed between first and second blocks of the video; and a display for displaying the capture video from at least one of an external target switch and an external target computer.

2. The computer as claimed in claim 1, wherein the communications device comprises a modem.

3. The computer as claimed in claim 1, wherein the communications device comprises a wireless transceiver.

4. The computer as claimed in claim 1, wherein the communications device comprises a wired adapter.

5. The computer as claimed in claim 1, wherein the communications device comprises an Ethernet adapter.

6. The computer as claimed in claim 1, further comprising a keyboard.

7. The computer as claimed in claim 1, further comprising a mouse.

8. The computer as claimed in claim 1, further comprising a user input device.

9. The computer as claimed in claim 1, wherein the communication device communicates using TCP/IP.

* * * * *